United States Patent
Weskamp et al.

(10) Patent No.: US 7,490,710 B1
(45) Date of Patent: Feb. 17, 2009

(54) FLEXIBLE MANUFACTURING SYSTEM HAVING MODULAR WORK STATIONS

(75) Inventors: Robert Weskamp, Long Grove, IL (US); Eric Walter Nordstrom, Arlington Heights, IL (US); Jason Arends, Gurnee, IL (US)

(73) Assignee: Wes-Tech Automation Solutions, LLC, Buffallo Grove, IL (US)

( * ) Notice: Subject to any disclaimer, the term of this patent is extended or adjusted under 35 U.S.C. 154(b) by 195 days.

(21) Appl. No.: 11/648,464

(22) Filed: Dec. 29, 2006

Related U.S. Application Data

(60) Provisional application No. 60/838,705, filed on Aug. 19, 2006.

(51) Int. Cl.
*B65G 37/02* (2006.01)
*B65G 47/24* (2006.01)

(52) U.S. Cl. .................... 198/345.3; 198/346.1
(58) Field of Classification Search .......... 198/345.1, 198/345.3, 346.2
See application file for complete search history.

(56) References Cited

U.S. PATENT DOCUMENTS

| | | | | |
|---|---|---|---|---|
| 3,527,087 | A | * | 9/1970 | Converse et al. ......... 73/116.02 |
| 4,617,623 | A | | 10/1986 | Inoue et al. |
| 4,726,577 | A | | 2/1988 | Pontis |
| 4,794,686 | A | | 1/1989 | Moore |
| 5,099,980 | A | * | 3/1992 | Babel ....................... 198/346.1 |
| 5,103,959 | A | * | 4/1992 | Carlson ..................... 198/345.1 |
| 5,143,195 | A | * | 9/1992 | Bloecker ................... 198/345.3 |
| 5,266,878 | A | | 11/1993 | Makino et al. |
| 5,363,785 | A | * | 11/1994 | Conley, Jr. ............. 112/470.06 |
| 5,529,166 | A | * | 6/1996 | Markin et al. ............... 198/349 |
| 5,781,983 | A | * | 7/1998 | Gruner ......................... 29/563 |
| 5,826,692 | A | * | 10/1998 | Blanc ....................... 198/346.1 |
| 5,927,463 | A | * | 7/1999 | Lee ......................... 198/346.1 |
| 6,220,174 | B1 | | 4/2001 | Gudel et al. |
| 6,349,237 | B1 | | 2/2002 | Koren et al. |
| 6,394,740 | B1 | | 5/2002 | Derby et al. |
| 6,445,959 | B1 | | 9/2002 | Poth |
| 6,647,605 | B2 | | 11/2003 | Hiramoto et al. |
| 6,688,452 | B2 | | 2/2004 | Watanabe et al. |
| 6,745,454 | B1 | | 6/2004 | Grimshaw et al. |
| 6,758,320 | B1 | | 7/2004 | Tegel |
| 6,789,659 | B2 | | 9/2004 | Spejna et al. |

OTHER PUBLICATIONS

Liberty Precision Systems, Technical Information -Linear Series, Rochester, NY (www.libertypi.com), date unknown.
Gudel, "roboLoop", (website www.gudel.com).

* cited by examiner

*Primary Examiner*—Mark A Deuble
(74) *Attorney, Agent, or Firm*—Vangelis Economou; IPHorgan, Ltd.

(57) ABSTRACT

A flexible manufacturing system utilizing modular work stations configured to provide asynchronous operations on a plurality of work pieces mounted on fixtures or pallets that are transported through the system by means of a conveyor or rail arrangement. The pallets are diverted from the track on which they are transported linearly to a desired machining module adjacent to, but removed from, the track, such that the machining is performed in a chamber isolated from the track. Each machining module may be utilized in more than one location on the track and the modules may be interchanged depending on the desired operation sequence and the tools available in each of the machining station modules.

10 Claims, 10 Drawing Sheets

FLEXIBLE MANUFACTURING SYSTEM HAVING MODULAR WORK STATIONS

REFERENCE TO RELATED APPLICATIONS

This is a non-provisional of U.S. Provisional Application Ser. No. 60/838,705, filed on Aug. 19, 2006, and which is incorporated by reference herein.

BACKGROUND OF THE INVENTION

1. Field of the Invention

This invention relates generally to a flexible manufacturing system and more specifically to such a system utilizing modular work stations configured to provide asynchronous operations on a plurality of work pieces mounted on fixtures or pallets that are transported through the system by means of a conveyor arrangement.

2. Background Art

In the manufacturing of certain metal workpieces to provide finished metal products, it is not possible to achieve the final piece shape and tolerances by metal casting, forging, and extrusion or forming alone. Part manufacture usually includes several different machining operations that must be applied to the original casting/forging, such as shaping, drilling, boring, milling, cutting, and tapping. Such final products may be utilizable in any of a number of industries, for example, in the automobile industry, to manufacture, without limitation, such products as engine manifolds, wheels, brake rotors, water and oil pumps, oil pan, engine covers, valve covers and suspension components. While the invention is described herein for use to manufacture metal components, it will be readily understood that the features of the invention can also be used to manufacture other types of parts, for example, to provide secondary operations on plastic parts or composite materials.

In mass production, it is necessary to organize a manufacturing process with high reliability, flexible part operations, short cycle times, easy maintenance, and worker safety while minimizing cost and space requirements. It is also highly desirable to achieve flexibility of the manufacturing process and the manufacturing equipment so that the process and equipment can be adapted at low cost to changes in part design, part mix, or part quantities, and is also easily adaptable from one configuration to another depending on the precise part which is being manufactured.

Flexible manufacturing systems utilizing automation are preferred because of increased quality, consistency and reduced set-up time and overall cost, resulting from increased efficiency, process control and reduction in need for manual labor. Flexible manufacturing systems have been used, inter alia, in cutting, forming, grinding, deburring, heat treatment and other operations performed on metal workpieces to render them into a product of desired size and configuration. Exemplary components of such flexible manufacturing systems include a plurality of machining centers and, optionally, may be applicable to numerically controlled machine tools, which tools directly process the workpieces by cutting, shaping or otherwise finishing the workpieces.

Automated machining systems typically utilize conveyors to move parts from one machining center to another, usually mounted on a fixture that itself may be mounted on a conveyor pallet. The workpieces are normally delivered to and removed from the machining station automatically by a conveyance, such as a track or rail arrangement. When a part is brought to the desired machining center, the part is optionally removed from the pallet, and loaded into and unloaded from the machine tool by auxiliary material handling devices, such as, for example, pick-and-place devices, loader gantries, multi-axis robot arms or sometimes on integrated pallet change devices. Transportation of the pallets, whether empty or loaded, may be performed by means of a dedicated track structure which would carry pallets from a pallet supply to the set-up station, and then to the machining centers and the numerically controlled machine tool under the control of a system controller. A flexible manufacturing system of this type further may preferably include a chip removal station, a workpiece cleaning station, a part inspection station, a parts marker and tool stacker, all of which are associated with other components of known systems.

The workpieces are fixed to pallets in a set-up station and then transferred to each of the machining centers and the numerically controlled machine tool for further operational steps. However, in most instances, the parts have to be removed from the pallets and transferred onto another fixture, associated with the machining station, which will receive a workpiece (e.g., an unfinished casting) mounted and automatically perform the desired machining operations on the workpiece. After the operations are completed at that station, typically, the parts are removed form the machining station fixture and remounted to the pallet for further transport to the next operation along the conveyor and additional machining operations.

Alternatively, in a few high end applications, parts are premounted on a fixture and transported on pallets between machining stations. In these applications, the transport of the parts to be machined are moved together with the fixtures (pallets) from the conveyor to an adapter associated with the specific machining center, as will be described below.

Various types of machining stations are known. Dedicated stations are constructed to perform a fixed set of operations and cannot be easily adapted to perform other tasks. Dedicated stations usually have a cost advantage when a large volume of parts are to be made and no significant design changes are necessary during a long production run. Another type of station uses computer-numerically-controlled software. Machines of this type are typically referred to as CNC machines. These are programmable to perform a variety of machining operations and are capable of producing parts with a lower number of machining stations and therefore requiring less relocation of a workpiece during manufacture. In addition, CNC machines are more easily adapted to new products or processes and can reduce overall capital investment for a changeover by decreasing the changeover time necessary between operations. A typical CNC machine has programmable multidimensional movement of both the tool head and the table that receives the fixture and workpiece. In most typical applications, CNC machines require a part-clamping fixture, designed and constructed to accept the specific part being processed, be attached to the table of the machine. These fixtures must be removed and replaced in the machine station with each part change. These types of fixtures, and the pallet pools required to be kept in stock, also tend to be relatively expensive.

These types of conventional flexible manufacturing systems, as well as other types, normally employ a single type of machining center, i.e., either vertical machining centers or horizontal machining centers. Since the vertical machining centers cannot normally work on a side surface of a workpiece, and likewise a horizontal machining center cannot normally work on a top surface of a workpiece, a need exists to turn the workpiece through any number of angles up to and including 90 degrees from the initial insert angle into the machining station of a workpiece to expose the workpiece surface requiring machining toward the specified tools having a specific orientation at that workstation. The machining centers capable of providing manipulations of a workpiece in almost all orientations, sometimes referred to as the degrees of freedom of motion, are rare, and thus a part may be required to be operated on at two separate work stations to complete the manufacturing thereof, with the possible requirement of changeover in the fixture between the two operations. This usually requires cumbersome and time-consuming manual workpiece set-up operations, which utilize labor-intensive processes. For example, if a workpiece is required to be processed by both a horizontal and a vertical machining station, it may become necessary to change the pallet or base on which the workpiece is mounted, or conversely, to transfer a pallet that is used for horizontal machining onto an adapter pallet that can provide for vertical machining, as is disclosed by U.S. Pat. No. 5,927,463 to Lee, so as to have compatibility with the specified machining center.

In view of the foregoing, it is desirable and even necessary to provide for an arrangement that uses a single pallet providing the fixture for both horizontal and vertical machining, in combination with a manipulation tool that is capable of improving the machining efficiency of work pieces while simultaneously providing a multi-axis positioning capability to the workpiece. As used herein, the term "horizontal pallet" is intended to mean a pallet particularly adapted for use with a horizontal machining center and the term "vertical pallet" is intended to mean a pallet particularly adapted for use with a vertical machining center.

To provide some flexibility in system configuration, combined vertical and horizontal machining centers may be used in a single flexible manufacturing system despite the possible incompatibility of their pallets. For example, U.S. Pat. No. 6,745,454 to Grimshaw et al. describes an overhead gantry system to transfer the workpieces between machining stations. Other known systems, for example, those described in aforementioned U.S. Pat. No. 5,927,463, describe workpiece stations that have both a pallet utilizable in a vertical machining center and an adapter that operates as a horizontal pallet so that a transfer of a vertical pallet to the horizontal adapter is necessary, depending on the desired machining operation. This transfer to the adapter necessarily requires the horizontal pallet to be fixed, e.g., clamped, onto the vertical pallet adapter and then relocated and indexed in relation to the workpiece prior to being fed to the vertical machining center, and vice versa. Thus, full automation of the flexible manufacturing system is not achieved, and the multiple clamps that are required between the workpiece and the machining station often lead to loss of precision and of repeatability in positioning, leading to a loss of precision and in repeatability thereby greatly reducing the productivity or yield rate and making the manufacturing process less economical.

An alternative adaptable type of CNC machine may be provided by the addition of a tool changer and tool magazine to the basic machine tool. In this configuration, the machine tool has a single spindle shaft, with a tool holder mounted to the distal end that can automatically grip and release a universal tool mounting feature. Also included in this machine configuration is a tool changer mechanism that can insert and remove tools from the tool mount. Further included in this machine configuration is a magazine device which can hold, and selectively present to the tool changer mechanism, a plurality of tools, each of which is prepared for a specific operation within the machining sequence designated for the manufacture of a part. At appropriate times during the execution of a machining program sequence, the CNC controller will call for the next required tool. The machine spindle will stop, move to the required location, and the tool magazine will present the required tool to the tool changer. The tool changer will then retrieve the required tool from the magazine, remove the current tool from the machine spindle, and replace it with the new tool. Once the tools have been exchanged in the spindle, the machine tool returns to its machining sequence, and the tool changer places the "old" tool into its appropriate location within the tool magazine for future retrieval, when needed.

The above-described systems have provided increased automation in the prior art devices. Nevertheless, previous automated systems have suffered from various drawbacks. For example, transfer of workpieces between work stations has remained labor intensive, slow, and/or inflexible (i.e., not easily adaptable to process changes or substitutions). A single workpiece may need to be swapped between various fixtures, or pallets, that are associated with and correspond to different machining stations when the particular set of machining operations to be performed on the workpiece occurs at several different machining stations. Overall precision, accuracy and repeatability of positioning suffers due to a loss of an exact registration in a reference position between fixtures or the requirement for multi-axis positioning and orientation. Another disadvantage has been the inaccessibility of the CNC machines during operation, making observation and maintenance more difficult. It is logical that reducing the number of adapters fixing the workpiece to the machining station workbase necessarily will reduce the possible error that may arise from inaccurate registrations between the various levels of adapters disposed between the workpiece, pallet and the workbase.

None of the prior art systems or methods known heretofore teach a flexible system capable of interoperability without requiring the removal and transfer of a workpiece or workpiece/pallet combination from one pallet capable of processing the workpiece in one orientation to another pallet capable of processing the workpiece in another orientation, or conversely, requiring vertical withdrawal of the pallet and workpiece structure, for example, by a gantry system. Heretofore known pallet transporting systems require the synchronous processing of separate workpieces at plural work stations, after which the pallets are sequenced simultaneously to the next work station where the immediately next operation(s) are performed on the workpiece. However, such systems, commonly called "transfer lines," are suited only for large batch jobs where the same parts or family of parts are made in great numbers. It is not well suited to providing smaller numbers (on the order of 1-3 parts, for example) of finished workpieces or different parts, for example ones or twos of a particular part that are made on a monthly basis. Also, it cannot provide easy interchangeability of the operations provided by the plural workpiece machining centers.

These and other disadvantages are overcome by the present invention.

SUMMARY OF THE INVENTION

Accordingly, there is described and claimed herein an automated flexible manufacturing system capable of modular interchangeability of the machining stations, comprising a track for transporting a combination of a workpiece mounted on a pallet, the track transporting the combination pallet and workpiece along a central track pathway defined by essentially upwardly extending walls located on either side of the central pathway, plural modular machining stations capable of being disposed substantially adjacent the track, each machining station being modularly attachable and detachable from the track, either as an integral unit with the adjacent track or separately as a module that is attached to the track. When attached to the track, an automated machining station is provided for processing the workpiece mounted on the pallet at a location removed from immediate vicinity of the track, and a workpiece diverter is disposed at least at one of the plural automated machining stations, the workpiece diverter including a diverter mechanism capable of transferring the pallet and workpiece combination from the track and to the automated machining station, the track having substantially transverse channels extending through one of the essentially upwardly extending walls to permit the pallet and workpiece combination to be diverted from the central track pathway and to the associated automated machining station, the workpiece diverter further having a retracting mechanism capable of retracting the pallet and workpiece combination from the machining station and replacing the pallet onto the central pathway of the track.

The flexible manufacturing system according to this invention provides improvements and has several advantages over the prior art systems. Such a flexible system may include a single transport line on a track having several attachment points at which a machining center module may be attached, detached, and replaced by a desired center for a particular sequence of manufacturing steps. The modularity of the centers at each of these attachment points is further enhanced by providing for attachment to the tracks at a work station attachment segment where a workpiece on a pallet can be loaded from the single track without impairing the operation or continued processing of the remainder of the system. In one embodiment, several modules can be utilized to simultaneously process different workpieces, either to provide the same machining operation or a different one, which operations may be performed in parallel to reduce the total operating time by performing simultaneously those operations that would otherwise create a bottleneck in the processing of parts.

It is a significant feature and distinct advantage of the present invention to provide a flexible manufacturing line and manufacturing process providing flexibility and adaptability to variation, improved maintenance of reference position on the fixture during manufacture, improved accessibility to machining stations during operation, and increased safety. Accordingly, the flexible manufacturing line and manufacturing process described, illustrated and claimed herein includes an automated flexible manufacturing system capable of modular interchangeability of the machining stations, comprising a track for transporting a combination comprising a workpiece mounted on a pallet, the track transporting the combination pallet and workpiece along a single central track pathway defined by essentially upwardly extending walls located on either side of the single central pathway, which may be a rectilinear track, plural modular machining stations capable of being disposed substantially adjacent the track, each machining station being modularly attachable and detachable from the track, either with or without the associated track segment, and, when attached to the track, providing an automated machining station for processing the workpiece mounted on the pallet at a location removed from the track; and a workpiece diverter disposed at least at one of the plural automated machining stations, the workpiece diverter including a diverter mechanism capable of transferring the pallet and workpiece combination from the track and to the automated machining station, the track having substantially transverse channels extending through one of the essentially upwardly extending walls to permit the pallet and workpiece combination to be diverted from the single central track pathway and to the associated automated machining station, the workpiece diverter further having a retracting mechanism capable of retracting the pallet and workpiece combination from the machining station and onto the single central pathway of the track.

Ideally, the flexible manufacturing system is capable of modular interchangeability of the work stations, so that different sequencing and interoperability of the machining centers is available to provide flexibility in setting up the sequence and order of the several operations available for processing of the workpiece at each station. The interchangeability feature is provided by detaching the desired track segment, together with its attached machine station, moving it to the desired location on the conveyor, and reattaching the track segment in the track at the desired location. Preferably, the flexible manufacturing system according to the present invention is capable of multi-axis machining without requiring any change in the set-up of the work stations.

In another embodiment, the invention comprises a trunnion for use in a flexible manufacturing system including a trunnion body having freedom to rotate around at least one or, preferably, two axes of freedom, an attachment mechanism for precisely attaching a pallet to the trunnion body, the pallet having an underside, and a plurality of pallet grooves disposed on the underside of the pallet, the pallet grooves having a preselected size, configuration and orientation, the attachment mechanism including a plurality of elongated, parallel clamping bars configured to have a cross-section smaller than, but essentially corresponding to the configuration and orientation of the pallet grooves, wherein the clamping bars are capable of insertion into the pallet grooves in a close fitting engagement, and an actuator providing for engagement of the pallet grooves relative to the clamping bars.

These and additional features will be described below in greater detail in the detailed description of the preferred embodiments. Benefits derived from the feature of the present invention include the capability of five side machining without requiring set-up change or manual intervention, and also in precision automatic positioning and orientation of the workpieces prior to machining operations being performed thereon.

DETAILED DESCRIPTION OF THE PREFERRED EMBODIMENTS

Figure 1:
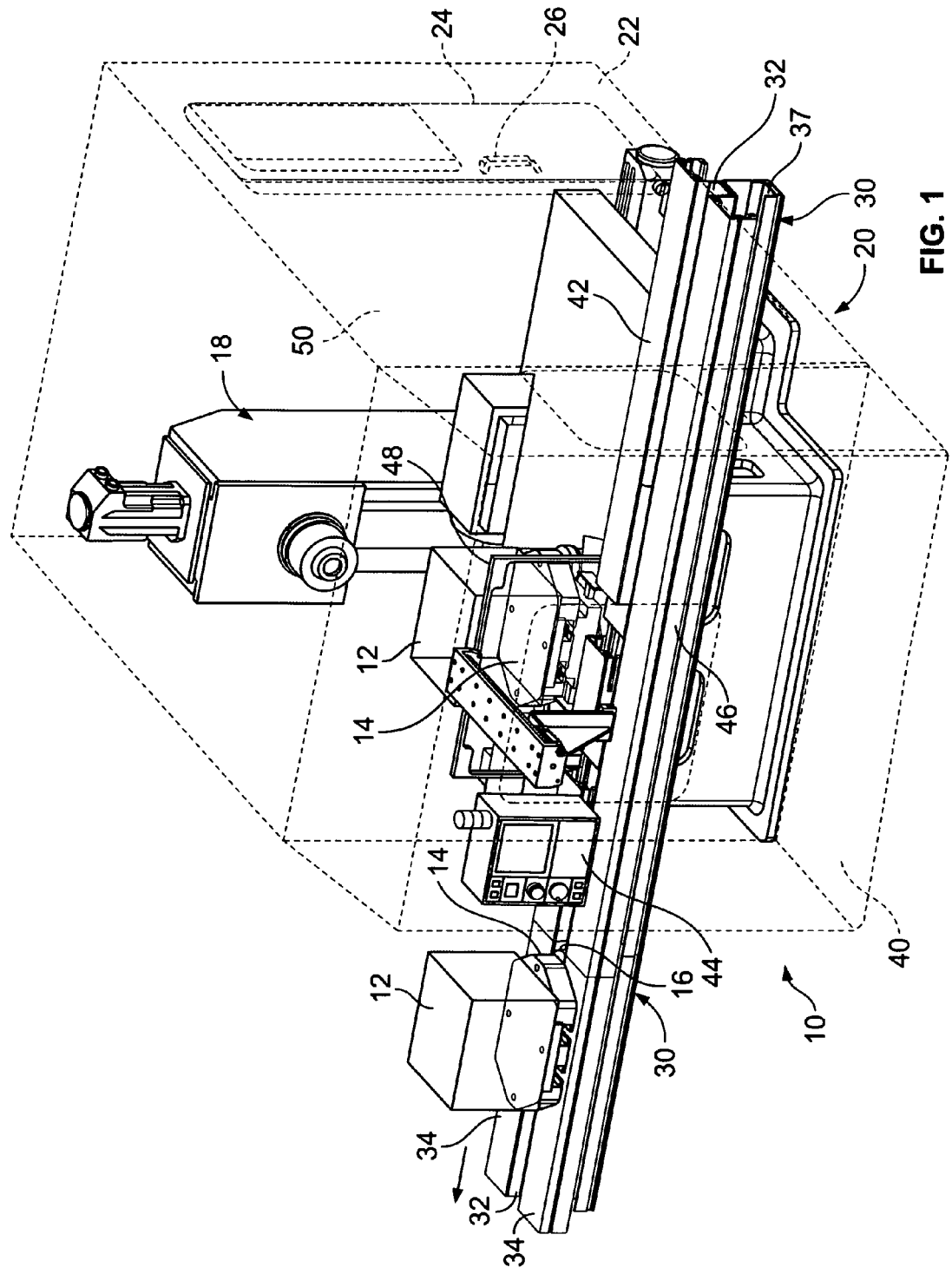
FIG. 1 is a perspective view of a machine module and conveyor assembly according to the present invention.

Referring now to FIGS. 1-6 together and separately, where appropriate, one embodiment of the inventive flexible machining system 10 is shown at different stages of the machining operations on the workpiece by the machining system. Specifically referring to FIG. 1, workpieces 12 are shown schematically as a cubic box, representing the nominal size of the total cutting envelope. Of course and actual workpiece 12 would appear in an actualized shape.

A first workpiece 12 is shown in the process of being transferred away from the machining module 20 following completion of its machining operations at that station. The workpiece 12 is being transported by the pallet 14, to which it is affixed, and along the track 32 of the conveyor 30. Once the machining operations performed on the workpiece have been completed, the conveyor 30 transports the workpiece 12 in the direction of the arrow to the next machining or other station (not shown in FIG. 1) in the system 10. The conveyor 30 may include a chain, as is known in the art and as is described in commonly owned U.S. patent No.

FIGS. 2-6 likewise illustrate the manner in which the workpiece 12, mounted on a pallet 14, is transferred into and out of the machining center module 20, so that the desired machining operations may be performed on the workpiece 12 while it is in the machining center module 20. The workpiece 12 is normally fixed onto the pallet at the input end of the machining system 10 at a beginning of the work cycle and before the workpiece 12/pallet 14 combination is deposited onto the conveyor assembly 30. Depositing the workpiece 12/pallet 14 combination onto the conveyor assembly 30 commences the transport cycle of the combination 12, 14 through the flexible manufacturing system 10, as will be described below.

Referring again to FIG. 1, the machining center module 20 includes an enclosure or housing 22, shown in phantom, which essentially encloses the workpiece 12 during the machining operations performed by the machine tools available at the machining station 18 (FIG. 2) provided at that particular machining module 20. Shown within the housing 22 and directly adjacent the machining station 18 is second workpiece 12, on which machining operations are commencing. The machining center module 20, as shown, is capable of accommodating several workpiece 12/pallet 14 combinations, for example, one in the process of being transported from the module 20, one within the module, and a third one (not shown in FIG. 1) that may be in the queue to be worked on at the next opportunity by the machining station within the module 20.

The enclosure or housing 22 provides for several features that enable the workpiece 12/pallet 14 combination to be loaded into the machining module 20 quickly, cleanly and efficiently, while simultaneously providing to an operator visibility of the machining station 18 and access to the work space enclosed by the housing 22 for maintenance, cleaning and tool changeovers. In referring to the workpiece 12/pallet 14 combination herein, it should be understood that during the operations performed after the workpiece 12 has been fixed to the pallet 14, reference to the workpiece 12 will necessarily include the pallet 14 to which it is attached, and reference to the pallet 14 assumes the attachment of the workpiece 12, unless specified otherwise.

The housing 22 preferably comprises a dual chamber arrangement, a first chamber 40, through which the conveyor assembly 30 passes, and a second chamber 50, in which the machining operations are performed. Openings 42 in the opposed ends of the first chamber 40 provide access for the conveyor assembly 30 to extend into and out of the first chamber, and also have sufficient dimensions to permit a workpiece 12 to pass into and out of the first chamber 40 on the pallet 14 that is being transported on the conveyor assembly 30. While the opening 42 is shown as being an unencumbered aperture having sufficient clearance at the outer edges to permit workpieces 12 of most expected sizes to pass into and out of the first chamber 40, it is possible to add shrouds or curtains at these openings to provide a further enclosure, as considered necessary. Conversely, the first chamber 40 may not be at all necessary, and the conveyor assembly 30 may be open to the environment, for example, a shop floor, in which the flexible machining system 10 is being used. The remaining elements of the system, of course, need not be affected by the presence or absence of the enclosure provided by first housing 40, as the transport operation provided by the conveyor assembly has been found to work equally well with or without the enclosure. It is preferable however, to utilize the enclosure of the first chamber 40 to maintain the cleanliness of the transfer mechanism, described below, and also to contain any noise or effluents from emanating out of the machining module 20 within the enclosure, thereby to inhibit them from spilling out on the shop floor. Safety is also enhanced by utilizing a housing 22 and an enclosure 40, or alternatively, a track comprising two parallel rods on which the track chain is supported, as is known, in order to provide a self-cleaning capability. The operating parts of the machine center module 20 are automatically controlled by CNC controls, and an enclosure which excludes accidental presence of an operator minimizes the risk of any possible pinch and/or impact hazards.

Figure 9:
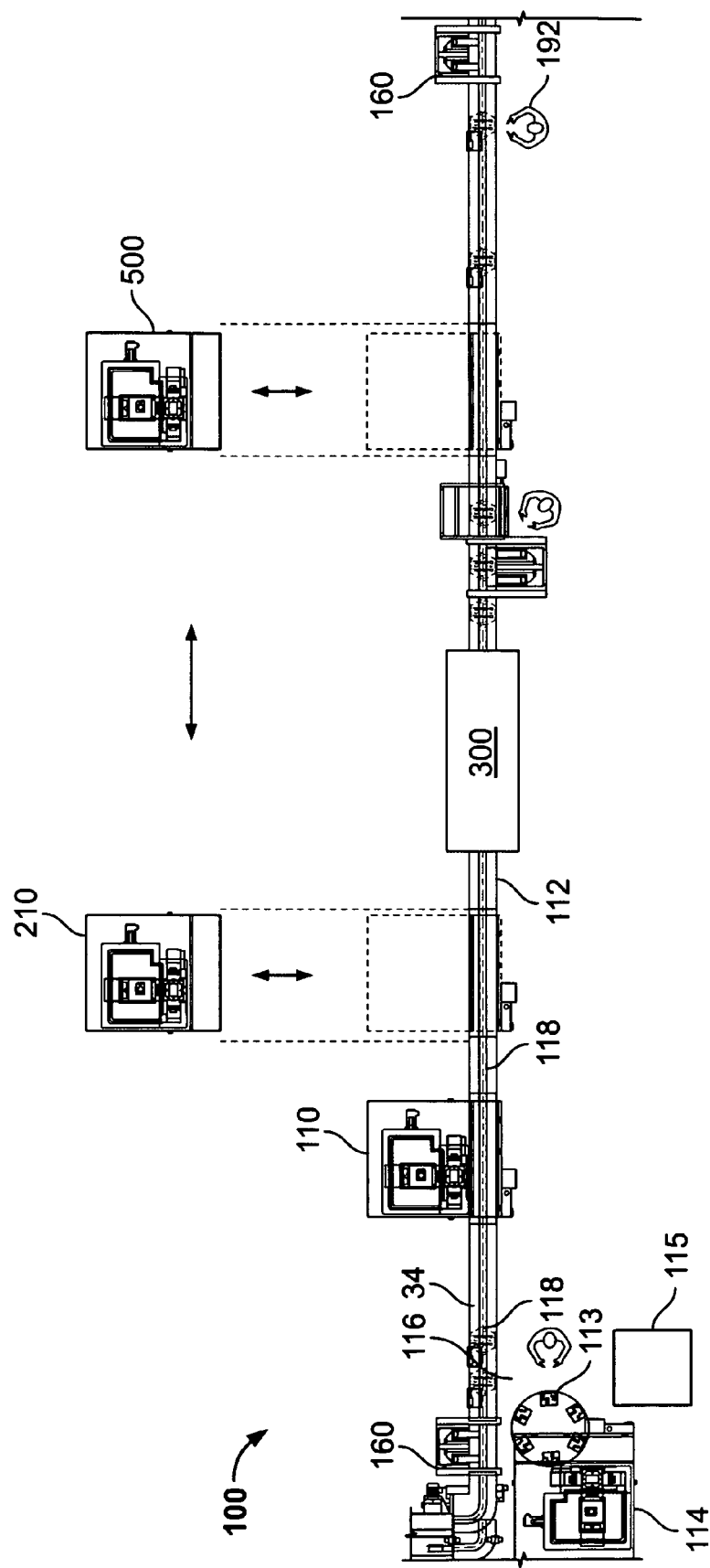
FIG. 9 illustrates, in a schematic view, the details of the system including plural machining station modules in a rectilinear configuration.
Figure 10:
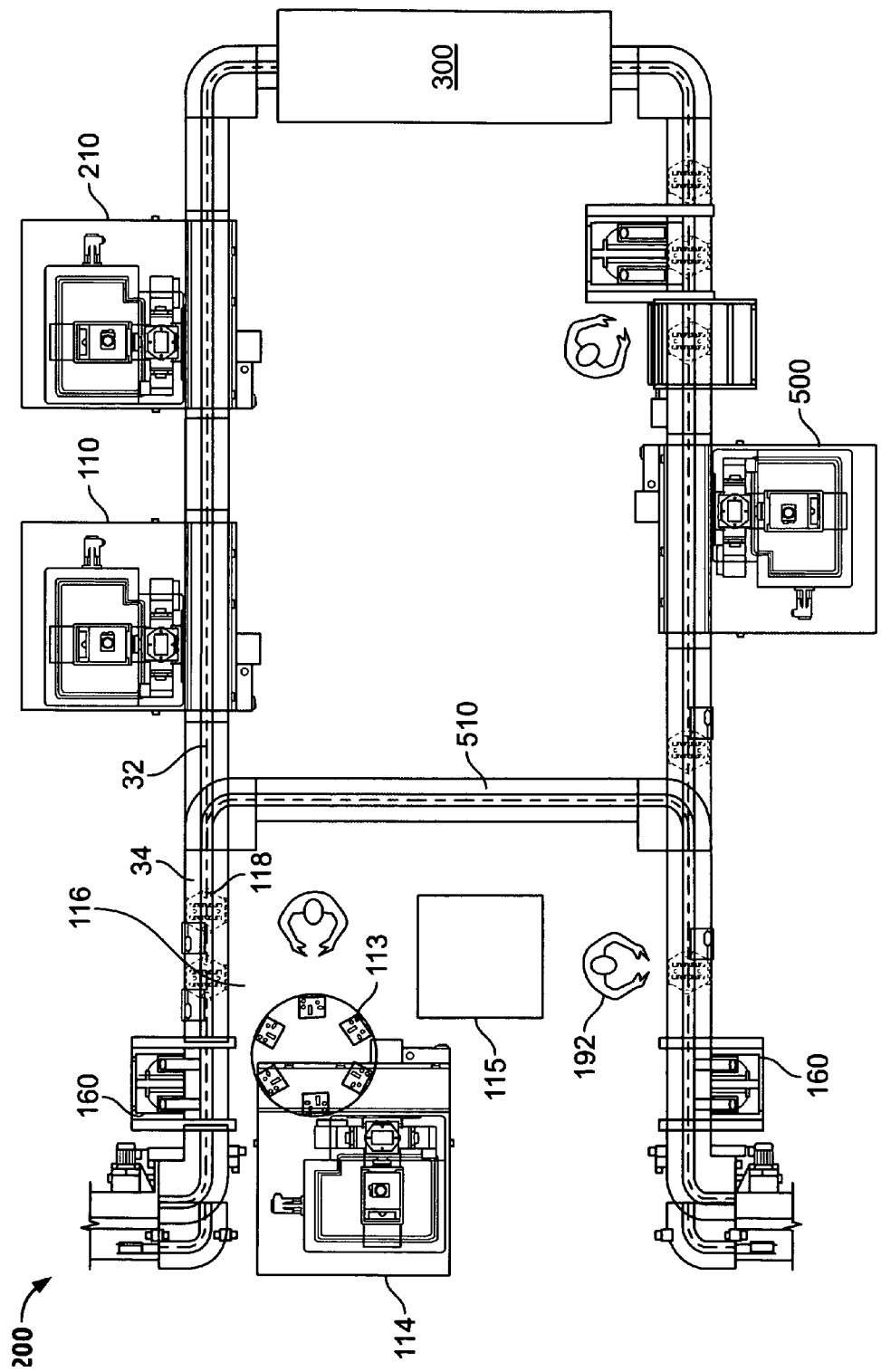
FIG. 10 illustrates, in a schematic view, the details of the system including plural machining station modules in a U-shaped configuration.

The track segment of conveyor assembly 30 shown in FIGS. 1-6 may be permanently attached to the housing 22 and to the included machine tool module 20 so as to create a unitary module that can be interchanged with other like configured modules. Ideally, the conveyor segments can be attached at their ends by an appropriate means (not shown) to adjoining conveyor segments to form a complete conveyor track, as is shown in FIG. 9 or 10. The attachment means may be a generally known means that are used in the industry to attach conveyor segments to each other. While not shown in FIGS. 1-6, the modules 20 may include means, such as casters or rollers (not shown) to enable the modules 20 to be laterally removed from the conveyor track and be transported to another section or to storage, the empty portion of the conveyor being then taken up by either a second module 20 or by a simple track extension, as required by the particular application, as will be described in more detail below.

An electronic monitoring station including electronic controls 44, for example, CNC controls, may be mounted on the outer wall of the first chamber 40 to permit manual intervention by an operator and monitoring of the operations occurring within the first and second chambers 40, 50. The electronic controls 44 are shown schematically as solid block outlines mounted on the wall of chamber 40, shown in phantom. Additional monitoring of the operations and performance within the machining module 20 may be provided through a window 46, which, in conjunction with a second slidable transparent gate 48 described in greater detail below, permits viewing of the workpiece 12 within the second chamber 50 while the machining operations are being performed thereon. Optionally, the electronic controls 44 may also include radio transmission feature that can communicate with a radio or infrared frequency identification device mounted on the pallets 14 so as to monitor and track the process history of each particular workpiece 12 mounted on the pallets 14.

The housing 22 includes a slidable side door 24 (shown in phantom), having a handle 26, for providing operator access to the second chamber 50. Such access may be necessary to maintain the equipment in the machining station 18, for tool changeovers, and for cleaning up the chips and other debris resulting from the machining processes performed on the workpiece 12. As shown, the door 24 has dimensions that close off the opening that provides access to the second chamber 50, which is preferably large enough for an upright operator to walk or lean through, in order to conduct the above-mentioned operations. While the door 24 is shown at the back of the side wall, door placement is arbitrary and may be in any portion of the housing 22.

FIGS. 2-6 illustrate successive stages of the transferring method and structure of the machining operations performed in the machining station inside the second chamber 50 and of the reloading of the pallet and workpiece 12 onto the conveyor assembly 30. For easier illustration of the structural details of the modules 20 of system 10, the enclosing walls of the housing 22 (shown in phantom in FIG. 1) have been omitted.

Figure 2:
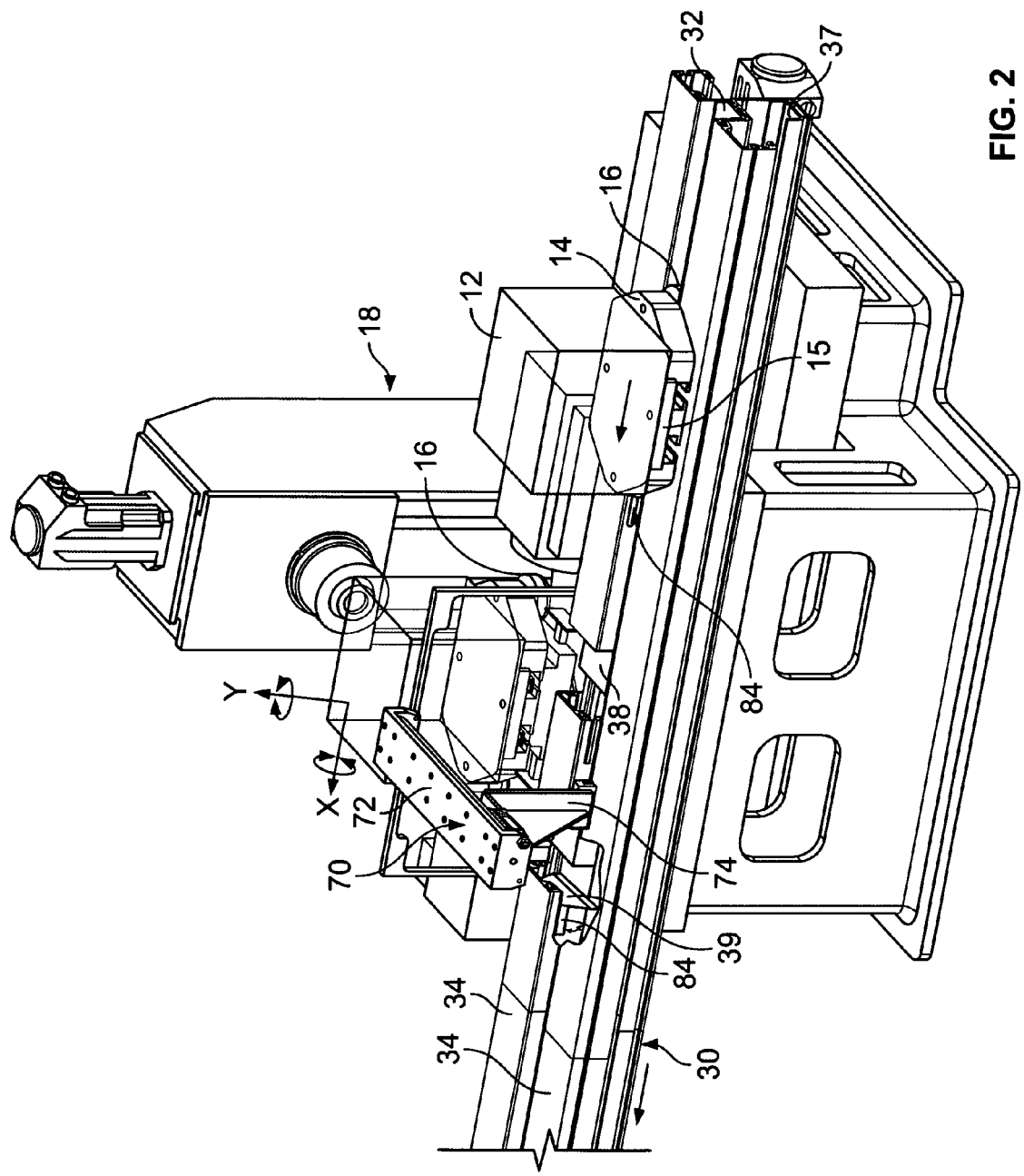
FIG. 2 illustrates, in a cutaway perspective view, the details of the machining station and the loading/unloading areas at an initial stage of the machining module operations.

Referring now to FIG. 2, the approach of a workpiece/pallet combination 12, 14 to the machining station 18 is shown. The machining station 18 is enclosed within the second chamber 50 (FIG. 1, in phantom) and the slidable gate 48 that separates the opening 49 between the first chamber 40 and second chamber 50 is shown in the closed position since the machining station 18 is shown operating on a workpiece 12 within the enclosure of chamber 50. FIG. 2 illustrates the operation of module 20, and shows the second workpiece 12, still on the track 32, as being restrained by a restraining device 84 of the conveyor 30, such as a swing-arm style stopping mechanism. After machining operations on the first workpiece is completed, and it is removed from the module 20 and repositioned onto the conveyor 30, the transfer operation from the conveyor assembly 30 into the machining station 18 of the second workpiece will commence.

The transport of the pallet 12 toward the machining module 20 is performed along the conveyor 30, which may be essentially a standard track conveyor, such as those described in commonly owned U.S. Pat. Nos. 5,372,240 and 6,460,684, with some slight modifications that will be described below, to enable the conveyor 30 to retard or delay the progress of a pallet 14 along the track 32 as appropriate. Other types of conveyor assemblies may be used, as known to those having ordinary skill in the art, the illustrated conveyor of the system 10 being shown herein only as an exemplary embodiment.

Generally, these types of conveyor arrangements include a central, longitudinal grooved track 32 that may be flanked by two horizontally extending top guide surfaces 34. The grooved track 32 also provides for disposition at a bottom portion thereof of a moveable conveyor (not shown), which is configured to move laterally along the grooved track 32 in the direction of the arrow (FIG. 1). The moveable conveyor engages the underside of one or more, but preferably two, carrier guide supports 16 protruding downwardly from the body of pallet 14, thereby urging the pallet 14 to be conveyed along the direction in which the conveyor is moving. The preferred position of the guide supports 16 is at the leading and at the trailing ends of the pallet 14, as shown, thereby maintaining a desired orientation of the pallet 14 relative to the longitudinal extension of the grooved track 32. For a more detailed description of the support guides and interaction with the conveyor, reference is made to the aforementioned commonly owned U.S. Pat. Nos. 5,372,240 and 6,460,684, the disclosures of which are incorporated herein by reference, where appropriate.

The pallet 14 underside can traverse along the conveyor track 32 by its interaction with the conveyor assembly 30. The pallet itself need not have any contact with the two top guide surfaces 34, as it is being supported mostly by the support guide supports 16 resting on the conveyor links within the groove 32. It should be noted however, that the engagement of the conveyor with the guides 16 is not a hard and fast one, in that the conveyor can continue to move relative to the guide supports 16 without carrying the guides with the conveyor if there is some mechanism that impedes the forward progress of the guides 16 and attached pallet 14. The two vertically extending walls defining the conveyor groove 32 provide for lateral guidance of the support guides 16, and maintain the guide supports within the groove 32.

The two top guide surfaces 34 on either side of the conveyor groove 32 are included to primarily provide for an area to house stop mechanisms, described below, and to contain other elements of the system 10, such as pneumatic hoses and electrical cables (not shown), as well as to mount pallet traffic sensors (not shown). As a secondary stabilizing mechanism, and usually required only when a pallet 14 enters at a sudden corner of the track 32, the pallet 14 occasionally may rock to one side, and one of the top guide surfaces 34 will then provide a stabilizing surface to maintain the pallet 14 in an upright condition. As is shown in FIGS. 1-5, the conveyor 30 includes a return track 37 for providing the endless loop formed by the conveyor chain that provides the motive power to the guides 16 of pallet 14.

Figure 4:
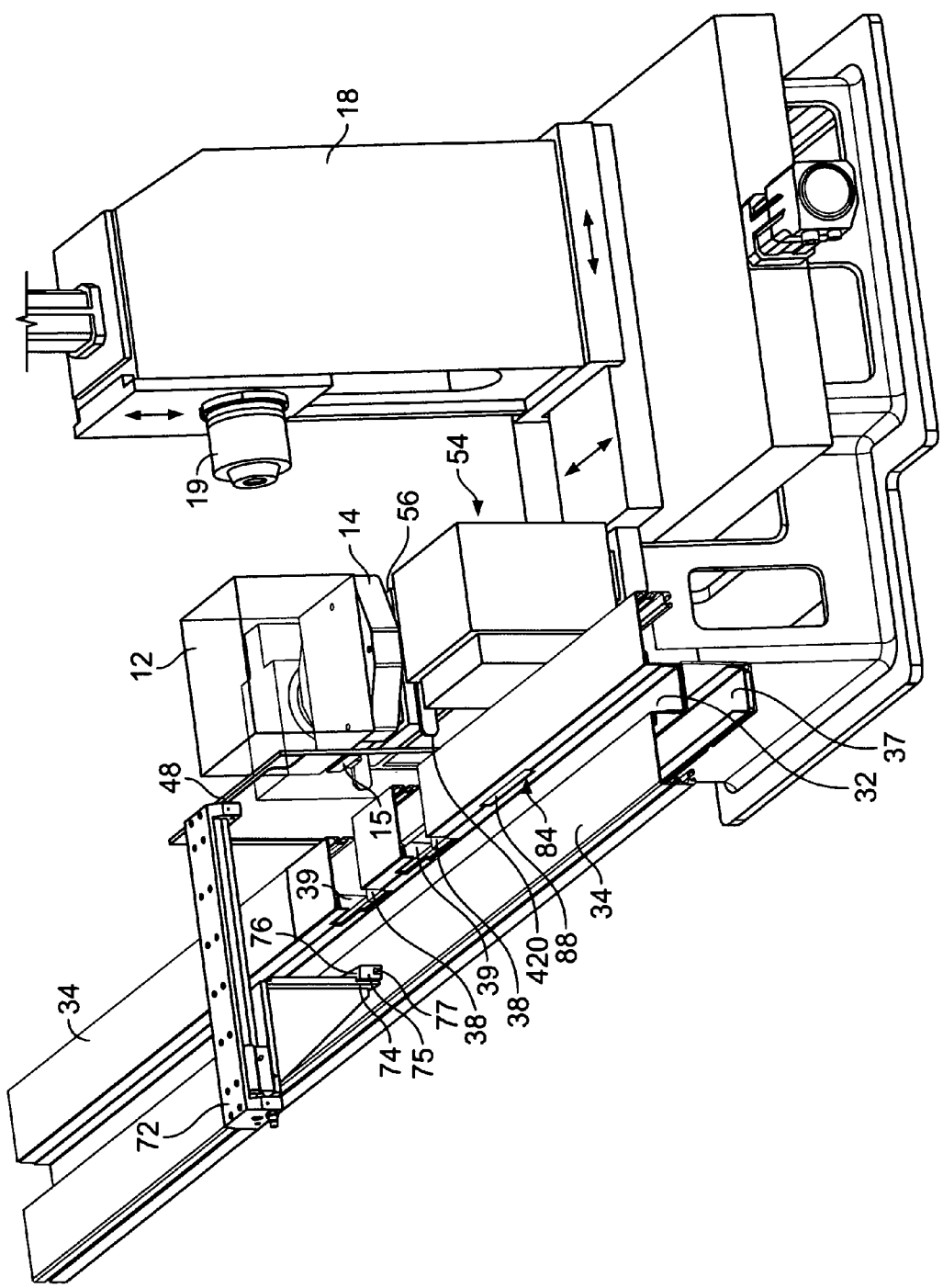
FIG. 4 illustrates, in a cutaway perspective view, the details of the machining station and the setup stage of the machining module operations.

To permit the lateral movement of the pallet from the track 32 in a direction perpendicular to the direction of normal travel, provision must be made for the withdrawal or egress of the support guides 16 in a direction lateral to the groove 32. As is best seen in FIG. 4, two cutout channels 38 are disposed in one of the side surfaces 34 of the conveyor assembly 30, i.e., the surface 34 that lies between grooved track 32 and the machining station 18. These channels 38 preferably are wide enough in the longitudinal direction to permit the support guides 16 to pass through the side surface 34 adjacent the track 32, without requiring the lifting or removing of the pallet 14 from the plane of the side surface 34.

In standard conveyor systems, such as those in the aforementioned patents, the grooved track provides a stop position so that the pallet combination 12, 14 stops at a machining station that is adjacent the conveyor assembly. The stop position is carefully indexed in the track to enable precise positioning of the pallet and workpiece combination relative to the machining station at which it is stopped, so that any machining operations are performed precisely where they are desired. At this stopped position, the tools of a standard conveyor system at that work station operate on the workpiece, and once completing the operation, the stop at this position releases the workpiece for continued transport by the conveyor to the next machining station. Pallet traffic control sensors (not shown) may be disposed at appropriate locations in order to provide continual monitoring information to the electronic controls 44 or to a central control station (not shown) in a manner known to those having ordinary skill.

An appropriate stopping mechanism may be provided by any of a number of devices, but one simple operational mechanism is a shuttle style stop, including the stop lever 84 capable of pivotally extending out of an aperture 88 of the groove wall and into the track 32 at a height calculated to engage the leading guide support 16 of pallet 14, and so retard the forward progress of the pallet 14 along the conveyor 30. That is, the lever 84 will contact the leading guide support 16 of the pallet 14 and stop further forward movement of the pallet 14, despite the continued movement of the chain of the conveyor 30 passing below the guide support 16. The direction of pivoting of the stop lever 84 is preferably in the direction of travel of the pallet 14 so that the release of the stop lever does not push the pallet 14 against the flow of the conveyor. To effect this configuration, the point around which pivoting lever 84 pivots is disposed at a leading edge of the aperture 88 through which the lever 84 extends, as shown in FIG. 4.

Other alternative stopping mechanisms may also be used, which will come to mind to persons familiar with the operation and structure of the conveyors for use in manufacturing. For example, rather than a pivotable lever, a constricting or angled member that reduces the width of the groove so it is smaller than that of the support guide 16 can also perform the function of stopping forward travel of one or more pallets, whereby the pallets are held in a queue until a machining center is ready to receive the next workpiece 12. Other alternatives may utilize a magnetic delay or a solenoid type plunger (not shown) capable of extending a bar or other stopping element into the path of the pallet 14 traveling along the track 32.

The heretofore known machining stations do not have a track and pallet interaction mechanism that can easily provide for lateral transfer of the pallet and workpiece from the track and into the machining station to provide unrestricted access to all five surfaces of the workpiece that do not directly engage the pallet surface. While some gantry and hydraulic mechanisms are known, none are simple and none are capable of providing for lateral movement of the workpiece to divert it from the track without removing the workpiece either from the pallet or from the conveyor track assembly, usually by means of a cumbersome gantry system. Moreover, none are capable of diverting the workpiece sufficiently so as to allow other workpieces in the sequence to continue on to the next work station while performing operations on the workpiece which has been diverted to a particular machining station.

To provide lateral engagement of the workpiece at the stop position, so as to permit the diversion laterally from the track 32 and into machining module 20, the track includes two lateral channels 38 cut into track surface 34, the longitudinal separation of the two channels 38 being essentially identical to the separation between the support guides 16 on each of the pallets 14. The width of each of the channels 38 should be slightly larger than the width of the support guides 16, leaving some clearance to permit the lateral passage of the support guides 16 through the channels 38 and out of the in-line path defined by the grooved track 32. Ideally, the stop position is disposed at the point in the grooved track 32 at which the support guides 16 correspond to and line up with the channels 38.

Diversion of the workpiece and pallet combination from the track after it has reached the stop position is effected by a push/pull arm assembly 70 extending laterally over the conveyor 30 and across both track surfaces 34. The push/pull arm assembly 70 comprises a push pull arm guide 72 that includes a signal connection to the electronic controls 44 so as to control extension and retraction of a push/pull arm 74. The push/pull arm assembly 70 is attached to the underside of the guide 72 and is movable along the guide 72 in the direction lateral to the longitudinal direction of the grooved track 32. In normal operation, the push/pull arm 74 includes a grooved engagement hook 76, best seen in FIG. 6, which passively self-engages a corresponding groove or extended position of the pallet 14, as will be described in greater detail below.

Figure 6:
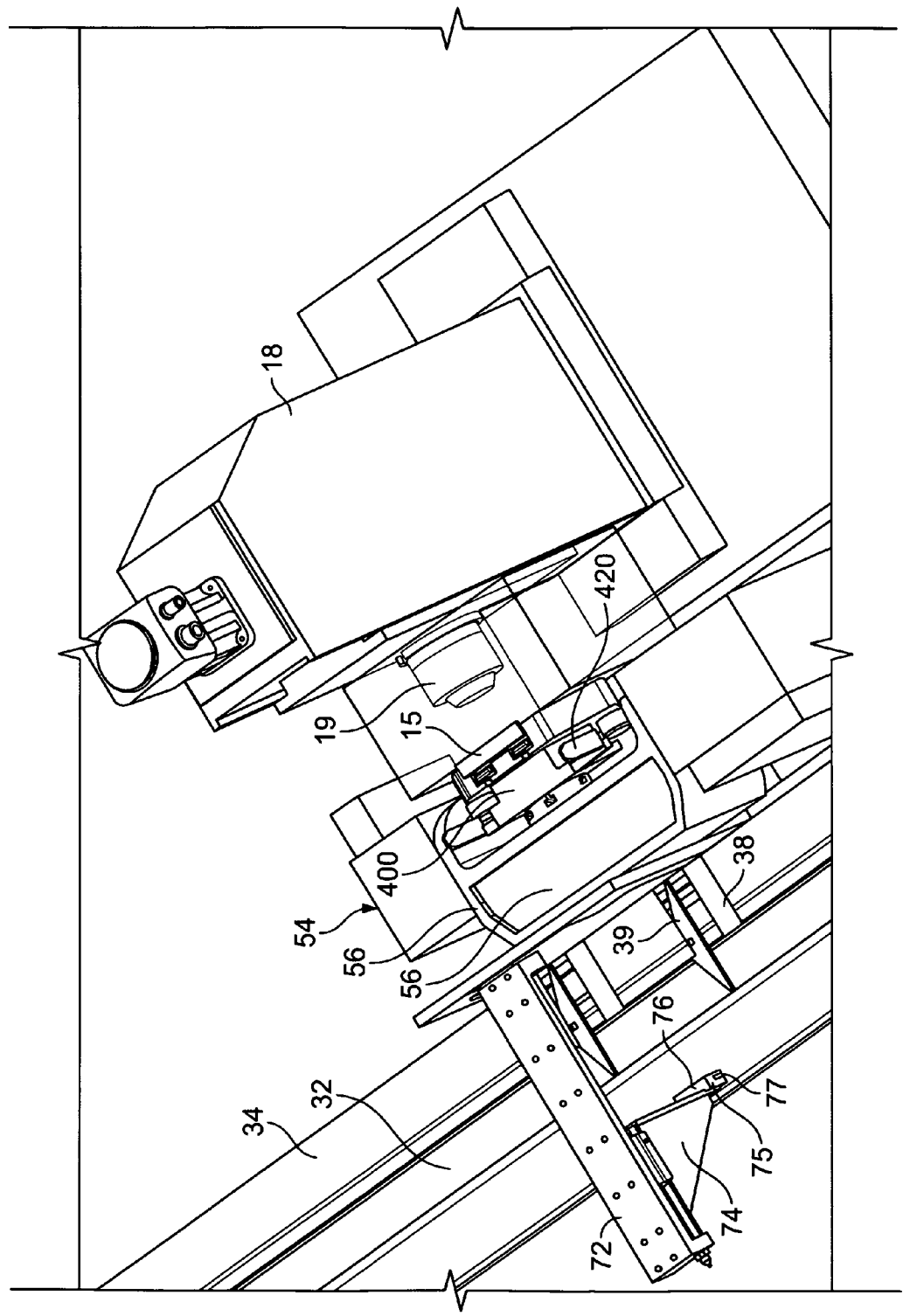
FIG. 6 illustrates, in a cutaway perspective view, the details of the machining station and the unloading stage of the machining module operations.

The push/pull arm 74 can move between an initial engagement position, shown in FIG. 2, where the push/pull arm 74 initially engages the pallet 14, and a loading position wherein the pallet 14 is pushed through the window 46, after the slidable transparent gate 48 normally covering the window is retracted. The retracted position of gate 48 is shown in FIG. 4, in which the window 46 is cleared for the passage therethrough of the pallet/workpiece combination 12, 14. The push/pull arm 74 remains in the initial engagement position with the hook 76 positioned and oriented at a height ready for receiving the upwardly extending plate 15, which together with the edge of pallet 14, define a groove at the lateral edge of the pallet 14. The motion of the pallet 14 along track 32 automatically positions the plate 15 within a groove of the hook 76, and the further motion of the pallet along track 32 is stopped by a swing arm type of stop, as shown in FIG. 6. The push/pull arm 74, after engaging the pallet at the initial engagement position, transfers the pallet 14/workpiece 12 combination to a set-up position by pushing the pallet 14 toward the machining station 18 and thus causing the combination to be inserted into the operation area within second chamber 50.

Other alternative arrangements can be provided by a person having ordinary skill, such as a pin (not shown) or a single downwardly extending flange (not shown) that can be configured to be received by a groove in the surface of the pallet 14 or a groove formed by a plate, such as plate 15 and the side wall of the pallet 14. Such a configuration may provide for the pin or flange to engage the groove in a way that movement of the arm 74 with the pin or flange will cause the pallet to follow, including to push the pallet 14 into the second chamber 50 and back onto the track 32 upon completion of the machining operations at that specific machining center module 20.

Appropriate pallet transfer guides 39 (best seen in FIG. 2, cutaway view, or FIG. 6) permit the support guides 16 to travel over the guide upper surfaces during the transfer of the pallet 14 from the track 32. These guides 39 can be extended from and retracted into an aperture 41 extending longitudinally along the side wall of track 32. When the guide 39, for example, a swing arm type, as shown, is extended into a desired position it can either stop the pallet 14 from further forward motion along the track 32 to permit loading into the second chamber 50, or swing out of the way to permit the pallet 14 to continue its journey through the system 100 (FIG. 9).

The extension and retraction of the guides 39 is controlled by the CNC electronic controls 44 once a signal is received that the workpiece 12 requires machining at that particular machining station 20. In one form, the guides 39 are swing type arms that swivel about an axis, as shown in FIG. 2, to stop the pallet guides 16 when in the extended position, ready for further actuation by the push/pull arm 74. When the particular workpiece 12 does not need machining steps at a machining station 20, the guide 39 is caused to swivel so that it is secreted into the aperture 41 and the guide 39 does not engage the pallet 14. Also the guide 39 may disengage from a pallet 14 that has been withdrawn by the push/pull arm 74 from a second chamber 50 following the machining process for further action downstream along the track 32.

During the loading procedure, the pallet/workpiece 14/12 combination is transferred to a workbase assembly 56 within the second chamber 50, having a rotatable and pivotable workbase 54, where the push/pull arm 74 then releases the engagement to the pallet 14, preferably by a pulling down operation of the pallet 14 to disengage an engagement hook 76, as is described in greater detail below. The workbase 54 is preferably in the form of a trunnion 54, which is pivotable around two separate axes, which axes preferably are orthogonal to each other, s shown by the X- and Y-axes in FIG. 2.

The push/pull arm 74 has only two positions, that is, an initial engagement position and an extended position. Preferably, the push pull arm guide 72 is disposed above the track surfaces 34 at a sufficient distance to permit the passage of all expected sizes of workpieces 12 underneath it. This configuration may require that the push/pull arm 74 extend toward the track surfaces 34 a sufficient distance so as to reach from the guide mount 72 to just above the track surface 34 and thereby to position the engagement hook 76 at an appropriate height relative to the track 32 and track surface 34. The engagement hook 76 is disposed at the lower end of the push/pull arm 74, and is preferably shaped and configured to engage the upwardly extending plate 15 at the lateral side of the pallet 14, and which itself has correspondingly similar dimensions for receiving the corresponding engagement hook 76.

Figure 3:
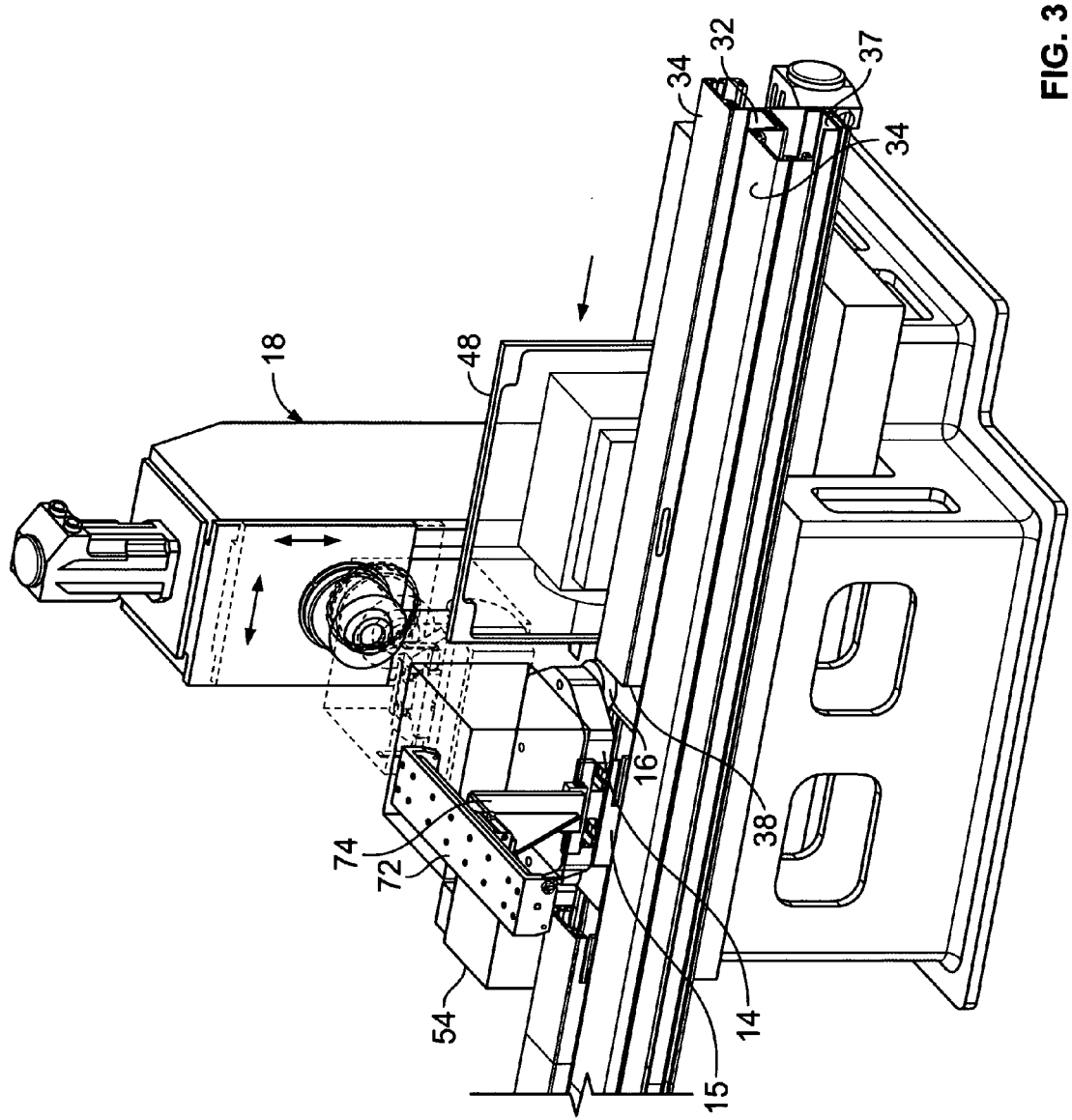
FIG. 3 illustrates, in a cutaway perspective view, the machining station and the loading stage of the machining module operations.

During the loading or unloading steps, the push/pull arm 74 may not require an active element to engage and disengage the pallet 14. Ideally, the engagement hook 76 includes a downwardly open groove 77 through which an upwardly extending edge 13 of the pallet 14 is able to pass, there being enough clearance in the thickness of plate 15 so as to avoid engagement of the groove 77 with the edge 13 because of interference. Preferably, the push/pull arm 74 passively engages/disengages the pallet 14 in the initial engagement position at a mating feature of the pallet 14, which may take any form, but is preferably the protruding edge 13 formed by either a groove in the top surface of the pallet 14 (not shown), or preferably a plate 15 attached to the lateral side of the pallet 14, thereby defining a gap between the side of the pallet body 14 and the inner surface of an attached plate 15, as shown in FIG. 3, with which the groove 77 can engage.

The transfer of the pallet 14 is effected by the lateral movement of the pallet 14 away from the conveyor 30 as biased and guided by the push/pull arm 74 after engagement in the initial engagement position. After the push/pull arm 74 reaches the extended position (shown in phantom in FIG. 3), the pallet 14 is engaged by the trunnion 54 and pulled downwardly, as will be explained below, and since the engagement hook 76 remains in the same horizontal position, the downward motion of the pallet 14 and edge 13 disengages the groove 77 from the protruding edge 13, thereby to release the push/pull arm 74 to enable it to return to its initial engagement position.

Likewise, when the pallet 14 is being returned to the track 32, the groove 77 of hook 76 of push/pull arm 74 passively engages the edge 13 of pallet 14 in the extended position by the vertical motion of the pallet 14 as it is raised by the locating features on the workbase 54, which act to pneumatically, hydraulically or mechanically raise and lower the pallet relative to the surface of the workbase 54. The push/pull arm 74 then effects the transfer of the pallet 14 onto the conveyor 30 by pulling it by the engaged protruding edge 13 to the track 32 through the channels 38. When the push/pull arm 74 again reaches its initial engagement position, the clearance between the elements defining groove 77 once again permit the longitudinal motion of the pallet 14 along the track 32.

Once workpiece/pallet 12/14 combination has been engaged in the set-up position on the workbase 54, the push/pull arm 74 is released from its engagement with the pallet 14 and can thus retract to its initial engagement position. In the initial engagement position, the push/pull arm 74 is on the opposite side of the grooved track 32 from the machining station 18, and the engagement hook 76 has enough clearance so that it does not inhibit the passage of other pallet/workpiece combinations along the track 32 and through the stop position of the particular machining module 20 illustrated in FIGS. 1-6. The initial engagement position of the push/pull arm 74, shown in FIG. 4, can permit the passage of the passing pallets 14, i.e., those pallets 14 not to be operated in that machining station 18, by allowing the protruding edge 13 of the pallet to glide through the groove 77 in the hook 76. As is seen in FIG. 4, the gate 48 once again has been slidably returned to its closed position, in which it covers the window opening 46 to isolate the second chamber 50 from track 32.

Referring now to FIG. 4, the workpiece has been loaded onto the workbase 54, which completes the indexing of the pallet relative to the workbase by inserting two or more projecting pins 415, 445 extending upwardly from the workbase 54 and into corresponding apertures or openings in the bottom surface of pallet 14 shaped and dimensioned to precisely receive the projecting pins therein. A hydraulic, pneumatic, mechanical or other mechanism then engages the pallet structure to firmly retain the pallet on the workbase and precisely position the pallet 14 relative to the workbase 54.

Figure 8:
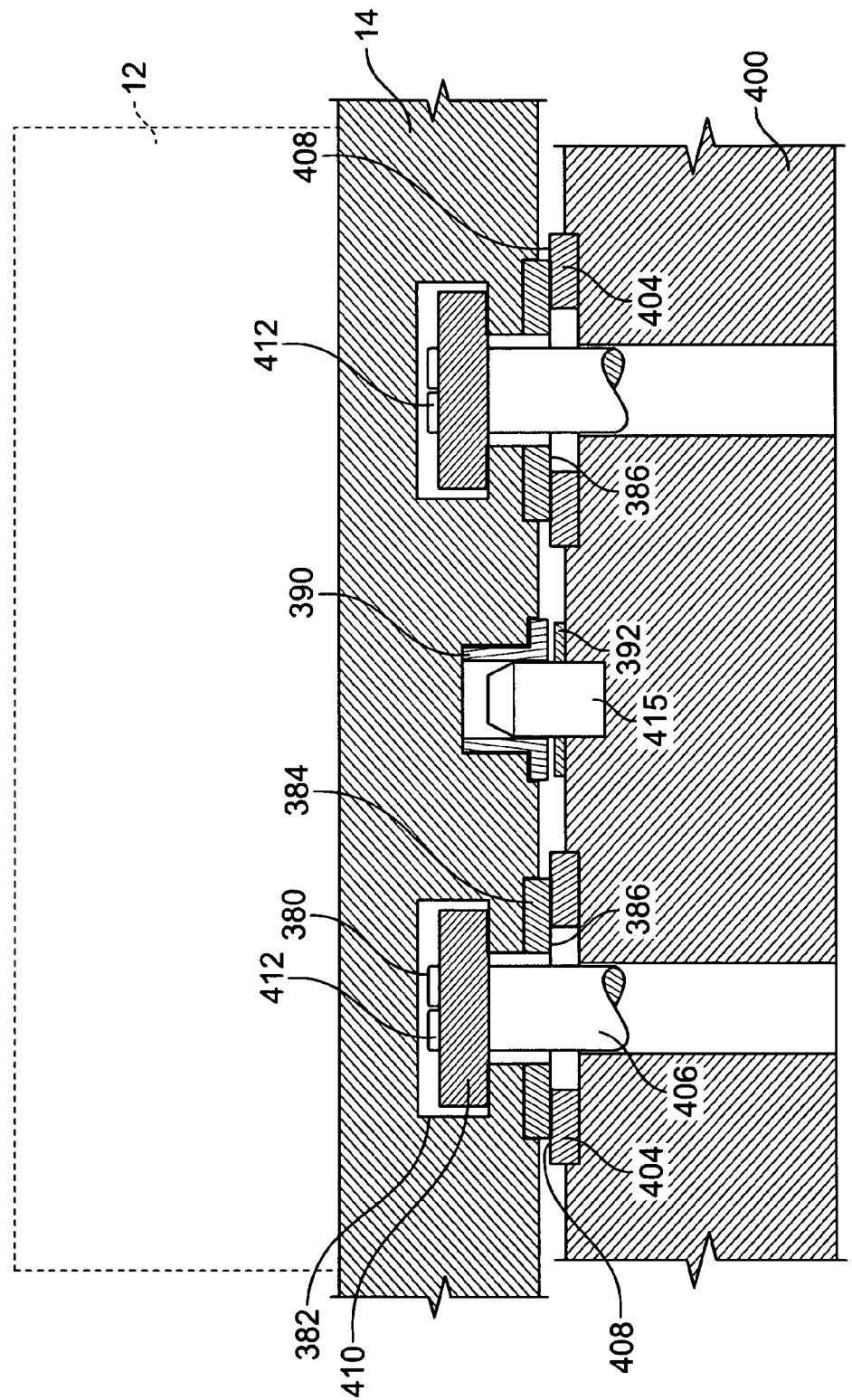
FIG. 8 illustrates, in a cross-sectional view, the details of the base and the pallet at the loading stage of the pallet to the base prior to the commencement of machining module operations.

The above described means for engaging the pallet 14 to the pallet base 400 also provides for a precise positioning in the Z-direction. Thus, the pallet 14 is precisely positioned in a preselected, and known, position relative to the workbase 54 and as a result of the previous attachment of the workpiece 12 to the pallet 14, the position and orientation of the workpiece 12 is precisely calibrated by the CNC machining controls 44 through the indexing provided by the projecting pins 415, 445 and the stop surfaces provided by bushings around the posts 416 (FIG. 8).

Figure 5:
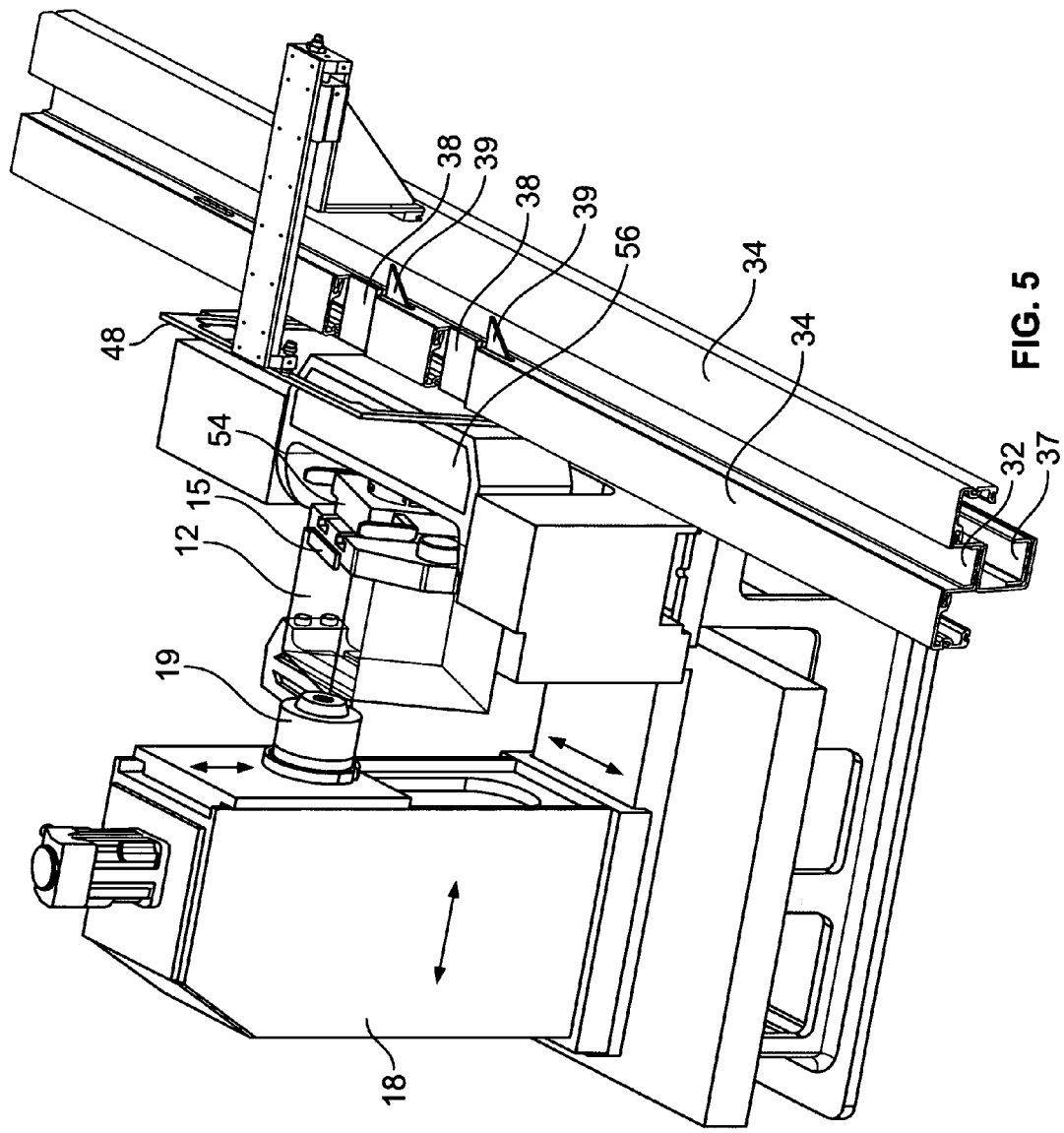
FIG. 5 illustrates, in a cutaway perspective view, the machining station during the machining stage of the machining module operations.

Once the indexing of the pallet/workpiece 12/14 combination is complete and the gate 48 has returned to its default closed position, as shown in FIG. 5, the workbase is movable in either one or two rotational fields of motion (see X- and Y-axes in FIG. 2), thereby providing indexable freedom of motion in two separate directions to the workpiece 12. The CNC machining station 18 may be a standard machining center that itself has freedom of motion in three orthogonal directions, as shown by the arrows, thus providing a five directional movements and the freedom of motion of the workpiece 12 relative to the machine tool 19 in five different modes, thereby permitting specified operation(s) to be performed on at least five surfaces of the workpiece 12 at that machining station 18. Of course, should it be necessary to perform one or more specified operation(s) on the sixth surface of the workpiece 12, that is, the surface to which pallet 14 is attached, another reattachment operation may be required to configure the workpiece 12 in a manner that exposes the sixth surface to the machine tools so that appropriate operations may be performed thereon.

To remove the workpiece 12 and pallet 14 from the machining station 18, the converse steps are taken, which include the opening of the gate 48 by sliding it out of the closed position at the window 46, and extending the push/pull arm 74 into the window 46, engaging the protruding edge 13 on the pallet 14 with the engagement hook 76 of arm 74 by appropriate lifting of the pallet/workpiece 14, 12 combination by the clamping bars 410, that is, by releasing the pallet 14 from the workbase 54 by the simultaneous lifting of the pallet 14 from the surface of workbase 54 and the resulting disengagement of the projecting pins 415, and extracting the pallet 14 by pulling the edge 13 from the second housing 50 so that the pallet is once again on the conveyor assembly 30 and the pallet support guides 16 are in the grooved track 32. The stop mechanism then retracts to release the pallet guides 16 and thus further forward motion of the pallet 14 is allowed, and the pallet is once again free to move in the direction of the conveyor motion, as shown in FIG. 1.

While the module 20 is shown as representing disposition along a segment of the conveyor assembly 30 and adjacent thereto, other modules are contemplated to be in a linear progression along other segments of the conveyor assembly 30 to provide different or alternate machining operations within each module 20, as needed. The pallets 14 may also include a radio frequency identification (RFID) tag 28 (FIG. 8) embedded in, for example, a corner thereof, that are in communication with the controls 44, the RFID tags providing the necessary information to the controls 44 as to the history and desired operations to be performed on a particular workpiece. Conversely, the RFID may indicate that a particular workpiece may not need any operations performed at one machining station, and so it can by-pass that station. The flexible machining system of the present invention permits this type of by-pass irrespective of whether there is another workpiece in the adjacent machining station, and thus, the workpieces may be asynchronous in the order in which they are transported along the conveyor assembly. That is, the order may be changed as needed at each machining station, so that the system 10 can operate more efficiently and quickly for any particular application.

The invention herein has been described and illustrated with reference to the embodiments of FIGS. 1-6 and 7, 8, but it should be understood that the workpiece diverter feature, the asynchronous sequencing of the workpieces and the modular aspects of the machining modules comprising the invention are susceptible to modification or alteration without departing significantly from the spirit of the invention. For example, the dimensions, size and shape of the housing and chambers may be altered to fit specific applications, as briefly discussed above. Similarly, the push/pull arm and assembly may be formed having different shapes or dimensions. Accordingly, the specific embodiments illustrated and described herein are for illustrative purposes only and are not to be considered as limiting the invention, which is defined and limited only by the following claims and their equivalents.

Figure 7:
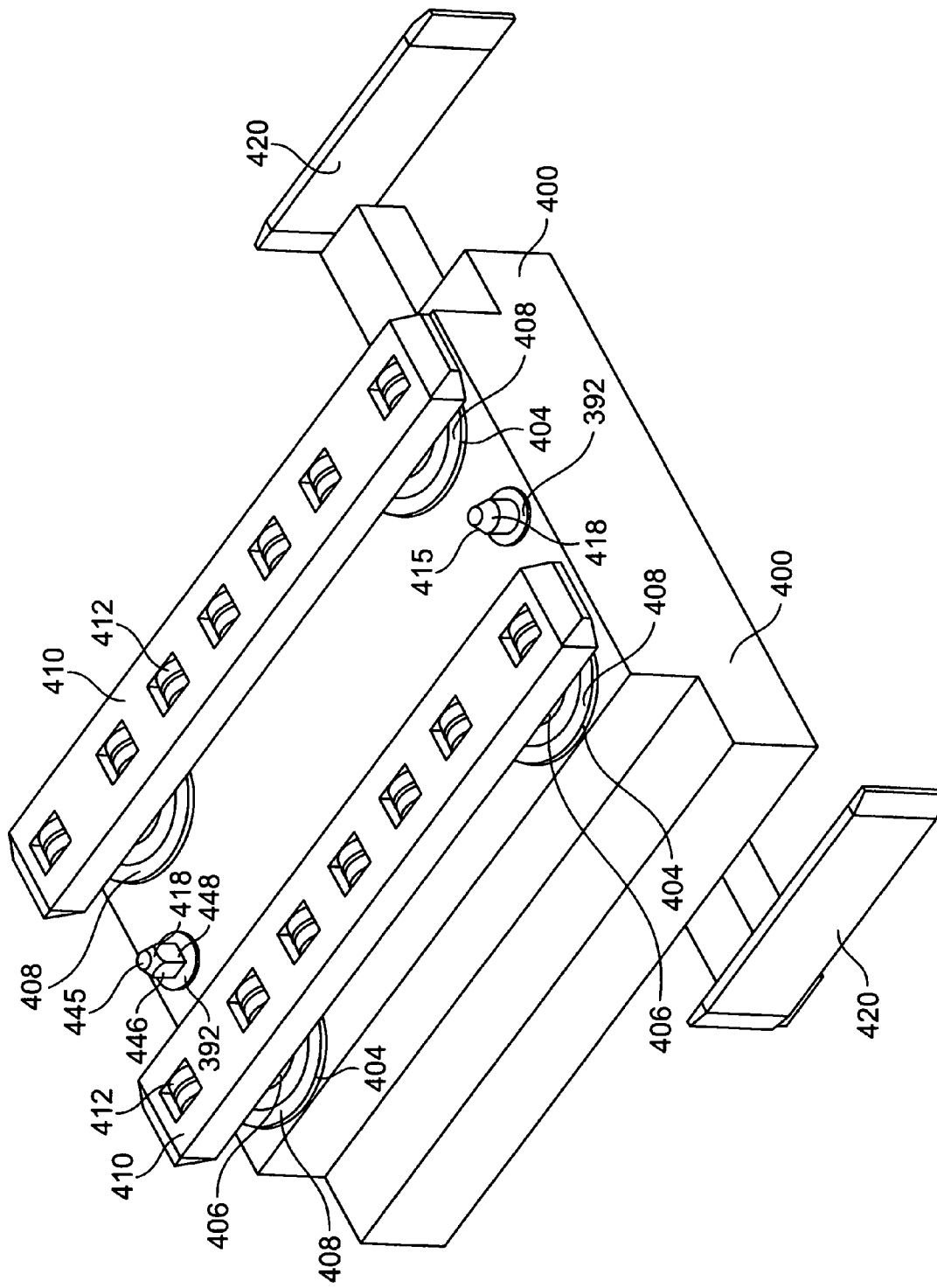
FIG. 7 illustrates, in a perspective view, the details of the base on which the pallet is mounted.

Referring now specifically to FIGS. 7 and 8, the pallet mounting structure is shown in greater detail, wherein the pallet 14 is mounted precisely onto the pallet base 400 so as to fix it in place before machining operations commence. FIG. 7 illustrates, in a perspective view, the details of the base on which the pallet is mounted. FIG. 8 illustrates, in a cross-sectional view, the details of the base and the pallet at the loading stage of the pallet to the base prior to the commencement of machining module operations. The two views are described together to provide a clearer understanding of the pallet mounting structure and operation.

Projecting pins 415, 445 (shown in FIGS. 7-8), provide for a precise positioning of the pallet in the X-Y directions of the plane, i.e. in the direction in which the clamping bars 410 extend, and where the upper surface of the pallet base 400 contacts the lower surface of the pallet 14, as will be described in greater detail below. The projecting pins 415, 445 are firmly fixed in the top or attachment surface of the pallet base 400, and are constrained from moving in any direction relative to the attachment surface of the workbase body. Preferably, the pins 415 and 445 have a different profile or shape as is often used for such arrangements for the reasons described below.

When the pallet 14 is in the desired position relative to the workbase 54, including to the pallet base 400, it is pulled downwardly toward the attachment surface of the pallet base 400 by hydraulic or other means attached to the bars 410. This motion of the pallet 14 engages the projecting locating pins 415, 445, each including an optional guide bushing 392, the dimensions of which each match a depression or an annular receiving aperture, as defined by a bushing 390 (FIG. 8), disposed in the bottom of the pallet 14.

As shown, the size of the annular aperture defined by bushing 390 matches almost exactly the dimensions of the bottom of pins 415, 445 so that very little clearance is allowed after the engagement of the pins 415, 445 in the corresponding apertures. This ensures that the horizontal indexing, that is, positioning in the direction parallel to the extension of the clamping bars 410, is as precise as possible. To aid in the engagement process of the pins 415, 445 and depressions around bushing 390, the pins may have an angled or conical surface 418 at an upper end, as shown. Alternatively, the depression 390 may have an angled surface (not shown) or both may have angled surfaces to guide the pins into the depressions. Downward motion of the pallet 14 ceases when precision reference surfaces 386 of bushings 384, disposed on the bottom of the pallet 14, come in solid contact with corresponding reference surfaces 408 of bushings 404 disposed on the top of the workbase 54, as described below.

To further provide for a precisely indexed attachment of the pallet to the workbase 54, one pin 445 has a different shape than that other pin 415. Pin 445 further comprises a "diamond" shape, having four flat vertical walls 448, oriented at an angle of about 45° relative to the longitudinal axes of clamping bars 410 extending along either longitudinal edge of the pallet base 400. The lateral corners 446 of the pin 445, one of which is visible in FIG. 7, each have a slight arc shaped around the corner, with a diameter corresponding to the aperture in bushing 390 of the pallet 14. This configuration helps to ensure the precise positioning of the pallet 14 relative to the pallet base 400 because it takes into account of differences in the exact dimensions between the apertures between the two bushings 390 of each pallet due to slight imperfections in the manufacturing of the pallet 14. While tolerances in the diameters of the apertures and the pins can be kept very precise, the distance between the apertures may vary to a slight degree. Thus the longitudinal indexing of the pallet relative to the pins may depend on some small part with which of the two pins 415, 445 the pallet 14 is more closely aligned.

In the configuration of the pin 445, the sharp diamond corners of the pin, herein the longitudinal corners, as they are oriented along the longitudinal direction, are somewhat smaller in diameter than the diameter between the corners 446, oriented in the lateral direction. Thus, the pin 445 can index the pallet 14 in the lateral direction because the diameter between the arcs at the corners 446 more closely correspond to the aperture defined by bushing 390. However, because of the smaller distance between the longitudinal corners, the longitudinal indexing is controlled only by the pin 415, as there is some tolerance between the longitudinal corners and the sides of the apertures.

Pallet base 400 is preferably made of a metal, such as stainless steel, that is sturdy and rigid, so as to provide the precise positioning of the workpieces 12 (shown in phantom in FIG. 8) on the pallet 14. To provide secure and precise engagement of the pallet 14 to the base 400, the two parallel clamping bars 410 are each connected to the base 400 by two mechanical, hydraulic or pneumatic lifter members 406 that may take the form of cylindrical shafts, as shown. Surrounding each lifter member 406 are rings 404 that include a stop surface 408 intended to engage the bottom surface of the pallet 14, as shown in the cross-sectional view of FIG. 8.

Each of the clamping bars 410 can easily slide within two corresponding parallel grooves 380 disposed along the bottom surface of the pallet 14, and extending transverse to the direction of travel of the pallet in the track 32 (FIG. 3), so that transverse shifting of the pallet 14 from the track 32 will fit the grooves 380 over and onto the clamping bars 410. To achieve this, the size of grooves 380 should be large enough to provide a clearance to the clamping bar dimensions, including clearance for a plurality of roller members 412 in the top surface of the clamping bars 410. Roller members 412 are preferably disposed at predetermined separations along the longitudinal extent of the bar 410 assist in sliding the pallet 14 over the bars 410.

Once the pallet has reached its extent over the bar 410, the lifter members retract into the body of the base 400, thereby engaging a groove surface 382 at a bottom portion of the groove 380. The lifter members 406 continue to retract until surfaces 386 of inserts 384 engage surface 408 of the positioning rings 404 on the surface of base 400, thereby fixing the Z-axis of the base relative to the pallet 14. The X- and Y-axes are fixed by at least one positioning guide pin 415 extending vertically from the surface of the base 410. Preferably, two guide pins 415, as shown, are provided to more precisely position the pallet 14 in the horizontal plane relative to the base 400.

Referring now to FIG. 9, a typical layout of the flexible manufacturing system is shown at 100. The conveyor portion of the system is configured as a straight production linear configuration conveyor 112. Preferably, the system 100 includes at a forward end a part qualifier station 114 into which raw or un-machined parts 113, are loaded from a raw parts supply 115. After the parts have qualified as being ready for further operations to be performed by systems 110, they are loaded at loading station 116 onto pallets 14 (shown in phantom) which may, for example, have the same configuration as pallets 14 of FIG. 2, in an exact indexing arrangement, ensuring precise positioning of the part 113 on the pallet 14 to ensure proper indexing when the parts 113 are being machined.

The parts 113 may be loaded and secured to the pallet 14 manually by an operator, as shown. It should be noted here that no further operator contact with the parts 113 may be required or is necessary until the parts have completed their traversal of the complete flexible manufacturing system and the parts are unloaded or removed from the system 110 or detached from the pallet 14 at an unloading station 192. Because of the flexible nature of the inventive system 110, loading of the workpiece parts 113 onto pallets 14 may proceed at a reasonable pace, so long as the loading rate is faster than the processing rate at which the parts 113 are operated on by the system 110. Preferably, the loading operation proceeds with the pallet 14 already resting on the track 32 of the conveyor 112, so that once the part 113 is loaded and secured onto the pallet 14, the pallet 14 and workpiece 113 combination is ready to be released to travel along conveyor 112 to the next desired station.

In line with the loading station 116 on conveyor 112, is the first operation station 110, which may have the configuration of the station 10 (FIG. 1), or another suitable configuration. As the parts 113 are loaded on to the pallets 14 and the pallets 14 proceed along the conveyor 112, engagement stops 118 are encountered, so that the further progress along conveyor 112 of a particular pallet 14 is delayed until such time as the next station, e.g., machining station 110, is ready to further process the part 113. The release of the engagement stop 118 is controlled by the stop members, which may be similar to the pivotable levers 84 (FIG. 4), so that no pallets 14 are permitted to continue their forward progress along the conveyor 112 at specified times. For example, the engagement stop 118 will not be permitted to disengage for the next pallet 14 to continue forward travel if there is another pallet in the conveyor between stop 118 and station 110, or if the station 110 is in the process of diverting a pallet into or out of the machining station 110, as described above.

The method or process by which the parts 113 are conveyed along the conveyor 112, and the diversion of the pallets 14 into the specified machining station 110, etc., for performing the specified operations is described above with reference to machining station 10 of FIGS. 1-6, and not be repeated here in detail. Once all of the operations are performed on the part 113 at the first station 110, it is released and returned to the track 32 of conveyor 112 to proceed to the next station 210. Of course, engagement stops 118 may be disposed between stations 110, 120 to delay the further progress of a part 113 along conveyor 112 until the next station, e.g., station 210, is ready to receive the next part 113 in line for processing therein. Conversely, depending on the operations that are necessary to be performed, the RFID may interact with a particular automated machining station 210 so as to control the stop mechanism and thus permit the pallet 14 to bypass the particular station 210 if no operations need be performed at that station. As described above, the bypass of a particular part 113 may occur irrespective of whether particular station 210 is in the process of performing one or more operations on a preceding part that has been directed into the station 210.

After the pallet 14 has progressed beyond the second machining station 210, the pallet 14 will approach the next operational station, in this case a washing station 300, disposed along the conveyor 112, where the part 113 is washed to remove any metal chips or debris that may have accumulated on the surface of parts 113 during the previous machining or other operations. The washing operation may be performed while the pallet 14 is still on track 32 of conveyor 112, or alternatively, a special configuration washing station (not shown) may include a diverter, as in the case of machine operation stations 110 or 210, to may remove the part 113 off the track 32 for washing or loading prior to shipment.

Following the washing station 300, the pallet 14 may proceed to an automated assembly station 400 where additional parts may be assembled onto the part 113. This station 400 is also shown as being in-line with the track 32 of conveyor 112, but alternatively, the station may be connected to a diverter as in the case of machine operation stations 110 or 120.

Proceeding further along the conveyor 112, the pallet 14 is brought into a final machining station 500, for example, the final bore and forming station 500, which may provide final steps finishing machining operations on part 113. This station 500 may be in most respects similar to stations 110, 210, or may have additional features that are necessary for the operation being performed therein. Another feature of the system 110 illustrated in FIG. 9 is the ability to quickly and easily interchange the machining stations, for example 210, 500, so that the system is configured to provide a desired sequence of operations to most efficiently provide the desired operations to manufacture a particular workpiece 113. Thus, the ability to swap out one machining center for another with a minimal amount of manual operations, while simultaneously minimizing disruption and downtime of the system 100, is important to provide the flexibility of the system in primarily changing between configurations for different types of parts, and as a secondary feature, enabling use of the least equipment and working space necessary to adequately perform the required operations for a wide variety of manufactured parts 113.

As shown in FIG. 9, the machining stations 210 and 500 have been withdrawn from their positions in the linear system 100 and moved to a location outside the system. Once removed, one of the machining stations may be swapped for the other, as shown by the double arrow A, or alternatively, another machining station (not shown) may be taken out of storage and may replace one of the stations 210, 500 withdrawn from the system 100. As another alternative, the removed station(s) may be replaced in the linear system with a linear track 32 to complete the conveyor 112, if there is no need to provide any additional operations for manufacture of the parts 113. Because the machining stations 210, 500 are integral with the segment of the conveyor 112 to which they are attached, the removal may be effected by a quick and straightforward disengagement of the connections of the track 32 at the respective ends, followed by the replacement segments being quickly attached at their respective ends to complete the linear track of conveyor 112. To permit the easy transpositioning of the track segments, it may be necessary to provide a means of either separating a link of the conveyor chain, or alternatively, to permit the chain to be lifted out of the tracks 32, 37 thereby permitting the withdrawal of a desired track segment with facility.

Referring now to FIG. 10, a system 200 is shown having a U-shaped configuration, rather than the linear configuration shown in FIG. 9. In the U-shaped configuration the pallets 14 will traverse a crescent or U-shaped loop, as shown, and after they are unloaded of their parts 113, the pallets 14 may directed to the beginning of the processing line to restart the process of transporting parts 113 through the system. The system uses an overhead pallet return 510 to provide the return path of the pallets 14 being returned to the operator, as shown.

The invention herein has been described and illustrated with reference to the embodiments of FIGS. 1-6, 7-9 and 10, but it should be understood that the features of the invention, for example, the pallet loading and unloading procedure for mounting the pallet onto the workbase or the mounting of a workpiece 12 onto the pallet 14, are susceptible to modification or alteration without departing significantly from the spirit of the invention. Other features will be readily apparent to a person of ordinary skill in the art. For example, the configuration shown in FIG. 9 will also require a pallet return (not shown), and one solution to return of pallets 14 is to have an overhead pallet return that is directly above the conveyor 30. As a further example, the configuration, dimensions, size and shape of the various machining centers, housings, parts or elements may be altered to fit specific applications or workspaces available for the systems 100, 200 or other similar systems. For example, the track may be formed in a different shape, dimensions or configuration, as described above. Other alternative configurations or dimensions of the elements, e.g. the pallets 14, or conveyor 30 are possible. In addition, while the systems 10, 100, 200 above have been described as engineered new systems, the invention is considered utilizable in a retrofit of existing systems which can utilize the features and improvements of the present invention. Accordingly, the specific embodiments illustrated and described herein are for illustrative purposes only and the invention is not limited except by the following claims and their equivalents.

What is claimed is:

1. An automated flexible manufacturing system capable of modular interchangeability of the machining stations, comprising:
  a) a track for transporting a combination comprising a workpiece mounted on a pallet, the track transporting the combination pallet and workpiece along a single central track pathway defined by essentially upwardly extending walls located on either side of the single central pathway,
  b) plural modular machining stations capable of being disposed substantially adjacent the track, each machining station being modularly attachable and detachable from the track, and, when attached to the track, providing an automated machining station for processing the workpiece mounted on the pallet at a location removed from the immediate vicinity of the track; and
  c) a workpiece diverter disposed at least at one of the plural automated machining stations, the workpiece diverter including a diverter mechanism capable of transferring the pallet and workpiece combination from the track and to the automated machining station, the track having substantially transverse channels extending through one of the essentially upwardly extending walls to permit the pallet and workpiece combination to be diverted from the single central track pathway and to the associated automated machining station, the workpiece diverter further having a retracting mechanism capable of retracting the pallet and workpiece combination from the machining station and onto the single central pathway of the track,
  wherein each of the plural machining stations includes a trunnion, the trunnion having a pivotable trunnion body and at least one attaching surface, and being disposed immediately adjacent the track for receiving the pallet and workpiece combination when it is diverted form the track by the workpiece diverter, the attaching surface being capable of retaining the pallet and workpiece combination in a fixed relation with respect to the attaching surface.

2. The automated flexible manufacturing system according to claim 1 wherein the track is essentially planar and rectilinear.

3. The automated flexible manufacturing system according to claim 1 wherein the track comprises plural segments and the plural machining stations are integrally attached to one of the track segments.

4. The automated flexible manufacturing system according to claim 1 wherein the track comprises plural segments and one each of the plural machining stations are capable of attaching to one of the track segments.

5. The automated flexible manufacturing system according to claim 1 wherein the pallet includes a plurality of pallet grooves disposed on the underside of the pallet, the pallet grooves having a preselected size, configuration and orientation, and the trunnion comprises a plurality of elongated, parallel clamping bars configured to have a cross-section smaller than, but essentially corresponding to the configuration and orientation of the pallet grooves, wherein the clamping bars are capable of insertion into the pallet grooves in a close fitting engagement.

6. The automated flexible manufacturing system according to claim 5 wherein the plurality of elongated, parallel clamping bars each further comprise a plurality of rollers on a surface thereof, the rollers being positioned and configured to engage a corresponding surface of the pallet grooves, thereby to facilitate insertion of the clamping bars into the pallet grooves.

7. The automated flexible manufacturing system according to claim 6 wherein the trunnion further comprises a plurality of lifter members for supporting the elongated, parallel clamping bars, the plurality of lifter members being attached on a side of the clamping bars opposite from the rollers, the lifter members connecting the clamping bars to the trunnion body, the lifter members being capable of actuation by an actuator to extend and retract the clamping bars from and toward the trunnion attachment surface.

8. The automated flexible manufacturing system according to claim 7 wherein the lifter members further comprise actuable supporting posts, and the attachment surface comprising a plurality of stop surfaces, each stop surface being associated with at least one of the supporting posts, each stop surface providing precise indexing of the position of the pallet relative to the trunnion body in the vertical direction perpendicular to the clamping bars.

9. The automated flexible manufacturing system according to claim 8 wherein the stop surfaces are provided by a ring that essentially surrounds each supporting post adjacent the point of attachment of the supporting posts to the trunnion body, and a pallet precision reference surface is provided adjacent the pallet groove at a location where the stop surface of the trunnion comes into contact with the pallet precision reference surface when the plurality of supporting posts are retracted to actuate the elongated, parallel clamping bars toward the trunnion attachment surface.

10. The automated flexible manufacturing system according to claim 8 wherein the trunnion body includes at least one pin extending upwardly from the attachment surface that corresponds to a depression in the underside surface of the pallet so that retraction of the clamping bars by the actuator causes the pin to engage the depression thereby providing precise indexing of the position of the pallet relative to the trunnion body in the horizontal direction parallel to the clamping bars.

* * * * *